United States Patent [19]
Phillips

[11] Patent Number: 5,598,315
[45] Date of Patent: Jan. 28, 1997

[54] SELF-POWER TRIPPING RELAY WITH BALANCED POWER SUPPLY CURRENT AND MEASUREMENT CURRENT

[75] Inventor: Timothy B. Phillips, Raleigh, N.C.

[73] Assignee: Square D Company, Palatine, Ill.

[21] Appl. No.: 604,209

[22] Filed: Feb. 16, 1996

Related U.S. Application Data

[63] Continuation of Ser. No. 144,116, Oct. 27, 1993, abandoned.

[51] Int. Cl.$^6$ ........................................................ H02H 3/00
[52] U.S. Cl. ................................ 361/93; 361/18; 361/94; 363/89
[58] Field of Search ............................... 361/18, 88, 91, 361/93, 94; 363/89

[56] References Cited

U.S. PATENT DOCUMENTS

| | | | |
|---|---|---|---|
| 3,582,982 | 6/1969 | Swinhart et al. | 317/22 |
| 3,660,718 | 5/1972 | Pinckaers | 317/13 |
| 3,683,237 | 8/1972 | Walstad et al. | 317/13 |
| 3,808,503 | 4/1974 | Hentschel | 317/13 |
| 3,875,464 | 4/1975 | Gary et al. | 317/13 |
| 3,988,641 | 10/1976 | Hentschel | 317/13 |
| 3,996,480 | 12/1976 | Hentschel | 307/235 |
| 4,025,883 | 5/1977 | Slade et al. | 335/16 |
| 4,041,540 | 9/1977 | Kempf et al. | 361/24 |
| 4,048,663 | 9/1977 | Lemke | 361/75 |
| 4,121,269 | 10/1978 | Hobson, Jr. | 361/44 |
| 4,509,088 | 4/1985 | Profio | 361/29 |
| 4,597,025 | 6/1986 | Rutchik et al. | 361/94 |
| 4,731,692 | 3/1988 | Dvorak et al. | 361/102 |
| 4,823,226 | 4/1989 | Reed et al. | 361/85 |
| 4,833,625 | 5/1989 | Fisher et al. | 364/518 |
| 4,879,626 | 11/1989 | Kim | 361/93 |
| 4,897,756 | 1/1990 | Zylstra | 361/44 |
| 4,992,723 | 2/1991 | Zylstra et al. | 323/284 |
| 5,016,135 | 5/1991 | Zylstra | 361/156 |
| 5,038,246 | 8/1991 | Durivage | 361/93 |
| 5,179,495 | 1/1993 | Zuzuly | 361/94 |
| 5,204,594 | 4/1993 | Carobolante | 318/254 |

FOREIGN PATENT DOCUMENTS

| | | |
|---|---|---|
| 0469207A2 | 2/1992 | European Pat. Off. . |
| 0477959A2 | 4/1992 | European Pat. Off. . |

OTHER PUBLICATIONS

Schematic for Micrologic Products.

Primary Examiner—Jeffrey A. Gaffin
Assistant Examiner—Sally Medley
Attorney, Agent, or Firm—David Russell Stacey; Larry I. Golden; Larry T. Shrout

[57] ABSTRACT

A current induction arrangement develops a power supply voltage and a measurement signal from current flowing in a circuit path so as to optimize both the energy developed in the power supply and the fidelity of the sinusoidal signal used to measure the waveform in the circuit path. The arrangement includes a capacitor accumulating current to develop a positive voltage with respect to common, a current transformer inducing current from the circuit path and providing an output having a positive induced-current signal component and a negative induced-current signal component. A rectifier circuit is arranged to receive the output from the current transformer, and to produce the positive induced current signal component at a positive output terminal and the negative induced current signal component at a negative output terminal. A first zener diode is connected to receive the positive induced-current signal component, and the circuit permits the positive induced-current signal to charge the capacitor. The first zener diode also has a second terminal coupled to common. A second first zener diode is coupled between the negative output terminal and common via a burden resistor. For developing a measurement voltage corresponding to the current produced by the current transformer, the burden resistor is arranged in series with the second zener diode. The positive and negative induced-current signal components are returned to the current transformers via common.

19 Claims, 5 Drawing Sheets

SELF-POWER TRIPPING RELAY WITH BALANCED POWER SUPPLY CURRENT AND MEASUREMENT CURRENT

This application is a continuation of application Ser. No. 08/144,116 filed on Oct. 27, 1993 now abandoned.

FIELD OF THE INVENTION

The present invention relates generally to circuit interruption arrangements and, more particularly, to current induction arrangements, such as used by circuit breakers and overload relays, which are powered from the circuit path they are arranged to interrupt (self-powered).

BACKGROUND OF THE INVENTION

The use of circuit breakers is widespread in modern-day residential, commercial and industrial electric systems, and they constitute an indispensable component of such systems toward providing protection against over-current conditions. Various circuit breaker mechanisms have evolved and have been perfected over time on the basis of application-specific factors such as current capacity, response time, and the type of reset (manual or remote) function desired of the breaker.

One type of circuit breaker mechanism employs a thermomagnetic tripping device to "trip" a latch in response to a specific range of over-current conditions. The tripping action is caused by a significant deflection in a bi-metal or thermostat-metal element which responds to changes in temperature due to resistance heating caused by flow of the circuit's electric current through the element. The thermostat metal element is typically in the form of a blade and operates in conjunction with a latch so that blade deflection releases the latch after a time delay corresponding to a predetermined over-current threshold in order to "break" the current circuit associated therewith.

Another type of circuit interruption arrangement, useful for interrupting circuits having higher current-carrying capacities, uses current transformers to induce a current corresponding to the current in the circuit path, and a rectification circuit to condition this induced current before charging a power supply capacitor, which provides the operating power to the arrangement, and before presentation to an electronic circuit measuring the induced current and detecting faults in the circuit path. In response to a power fault being detected, the electronic circuit generates a control signal to actuate a solenoid (or equivalent device) to cause the circuit-interrupting contacts to separate and interrupt the circuit path.

A primary difficulty in designing such a self-powered circuit interruption arrangement concerns the type of current transformers used to induce the current from the circuit path and the circuit design for conditioning the induced current. The current transformers must be able to deliver the required current for operating the electronic measuring circuit at a suitable power supply voltage, for example, about 12 volts. At the same time, the induced current needs to be as sinusoidal as possible so that an accurate measurement can be made for the purposes of determining whether or not to trip in the presence of an overload or other type of fault. An objective for many current-interruption applications is to meet these requirements using the smallest possible current transformers and with a primary excitation current which is extremely low, for example, of 3 amps or less.

This objective has not been adequately addressed in known circuit interruption arrangements. For example, using a conventional isolated Wye connection, as shown in FIG. 1, each of the current transformers 20 provides induced current to a three-phase rectifier 24 having a positive output 26 and a negative output 28. The positive output 26 is used to deliver the required current for charging a capacitor 30 and operating the measurement electronics circuit 32. A first clamping circuit comprising a 12 volt zener diode 34 and a blocking diode 36 are used to ensure that the capacitor charges positively and at voltages not above 12 volts. At the other side of the rectifier 24, the negative output 28 is used to return power supply current and to provide a current signal from which the measurement electronics circuit 32 can accurately analyze for power faults. A burden resistor 38 is used to convert the current signal to the voltage signal used by the measurement electronics circuit 32 for the analysis. In this arrangement, the current required at the positive output 26 for waking (or powering) up the measurement electronics circuit 32 is significantly less than that required at the negative output 28 for sinusoidal fidelity.

A significant improvement over this conventional isolated wye connection is the approach illustrated and described in U.S. Pat. Nos. 4,041,540 (Kampf et al.) and 4,048,663 (Lemke), and assigned to the instant assignee. See also U.S. Pat. No. 4,121,269. In this approach, a grounded wye connection similar to the arrangement of FIG. 1 is used but modified in that the component interconnection point for the zener diode 34, the resistor 38 and the capacitor 30 is also connected to circuit common (ground) at the current transformers (hereinafter, the "Kampf-modified arrangement"). Thus, two current paths are effectively produced. One current path conducts positive half-cycles from the positive output 26 of the current transformers, through the power supply capacitor 30 and the zener diode 34, while the other current path conducts negative half-cycles through the burden resistor. Each current path returns via the connection to circuit common (ground) at the current transformers.

Since the burden resistor 38 in this modified configuration produces much less voltage drop across the current transformers than does the power supply voltage, the required fidelity of the current in the negative half-cycle is obtained with much lower primary current than before. Since the current for the power supply is now being supplied only during the positive half-cycles, much more primary current is now required to deliver the power supply's needs. Also since the volt-seconds produced must be the same on the positive and negative half-cycles, and since the positive half-cycle must produce much more voltage to conduct than the negative half-cycle, the current transformers will conduct for a much shorter time in the positive direction. Unlike the unmodified operation of the arrangement of FIG. 1, this means that the current required at the positive output 26 for waking (or powering) up the measurement electronics circuit 32 is significantly more than that required at the negative output 28 for sinusoidal fidelity.

Accordingly, the aforementioned requirements are not met by either type of approach, and there is a need for a circuit interruption arrangement which overcomes the aforementioned shortcomings.

SUMMARY OF THE INVENTION

The present invention provides an arrangement for inducing (and conditioning) current for optimization between the current necessary to power an electronic circuit and the

3 fidelity of a measured current waveform, so that they are both at acceptable levels at the same time.

In one implementation of the present invention, a current induction arrangement develops a power supply voltage and a measurement signal from a circuit path, with the arrangement including: a power supply including a capacitor arranged to accumulate current to develop a voltage with respect to common having a selected polarity; a current transformer inducing current from the circuit path and providing an output having a first induced-current signal component of the selected polarity and a second induced-current signal component of the opposite polarity; a rectifier circuit arranged to receive the output from the current transformer, and produce the first induced current signal component at a first output terminal, coupled to the capacitor for accumulating thereat, and the second induced current signal component at a second output terminal; a first voltage clamping circuit receiving at least a portion of the first induced-current signal component, the first voltage clamping circuit having a first clamping terminal coupled to the first output terminal and a second terminal coupled to common; a second circuit including a voltage clamp circuit and coupled between the second output terminal and common, the second circuit arranged for developing a measurement voltage corresponding to the current produced by the current transformer; and the first and second induced-current signal components being returned to the current transformers via common.

The above summary of the present invention is not intended to represent each embodiment, or every aspect, of the present invention. This is the purpose of the figures and the detailed description which follow.

BRIEF DESCRIPTION OF THE DRAWINGS

Other objects and advantages of the invention will become apparent upon reading the following detailed description and upon reference to the drawings in which.

Figure 1:
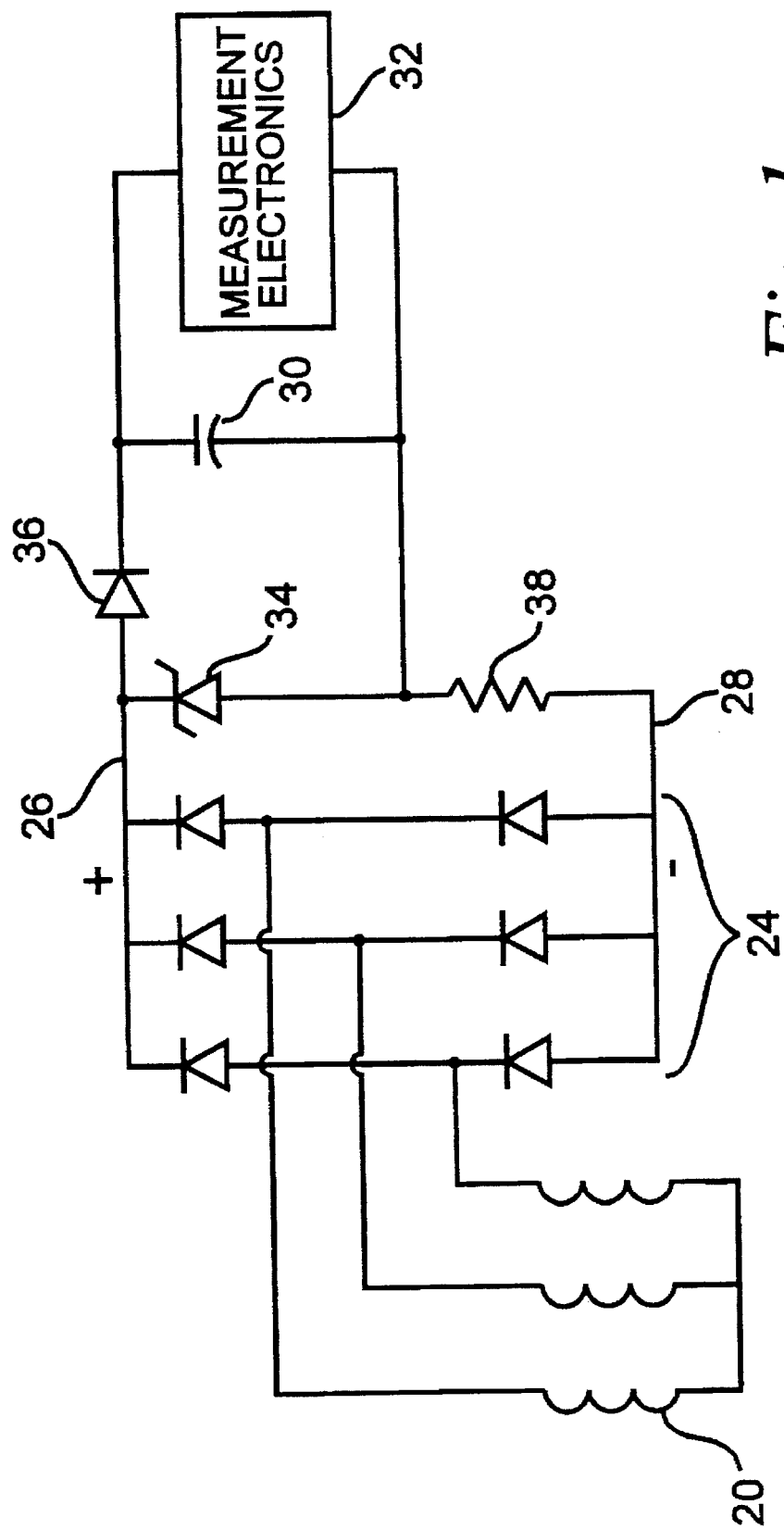
FIG. 1 is a schematic illustration of a typical isolated wye connection used in a circuit interruption system, in accordance with the present invention.

While the invention is susceptible to various modifications and alternative forms, a specific embodiment thereof has been shown by way of example in the drawings and will be described in detail. It should be understood, however, that it is not intended to limit the invention to the particular form described. On the contrary, the intention is to cover all modifications, equivalents and alternatives falling within the spirit and scope of the invention as defined by the appended claims.

4

DETAILED DESCRIPTION OF THE FIGURES

Figure 2:
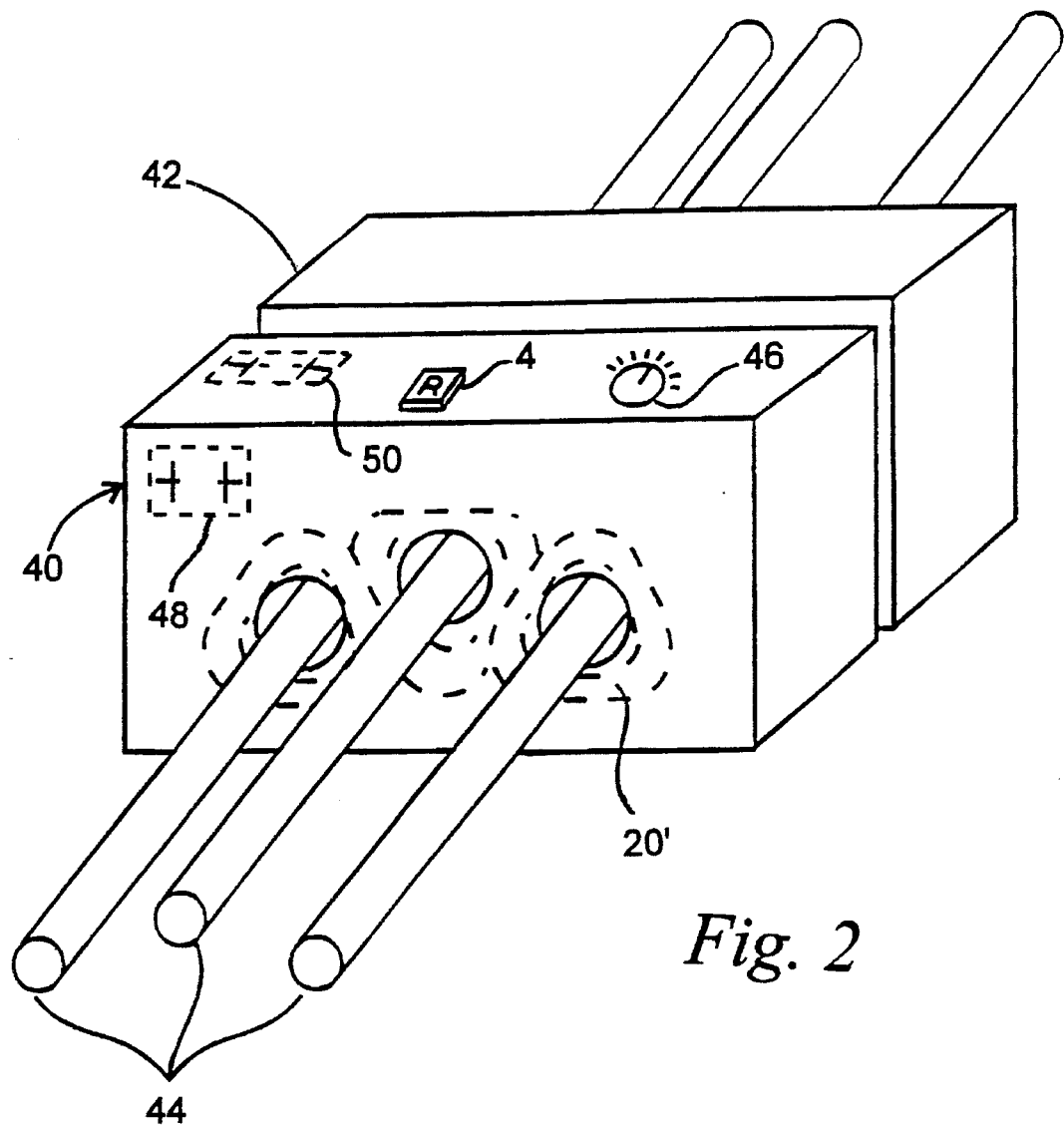
FIG. 2 is a perspective illustration of a circuit interruption system, in accordance with the present invention.

The present invention may be used in a wide variety of residential, commercial and industrial applications. For the sake of brevity, however, the implementation of the present invention to be described and illustrated below is directed to high-performance applications requiring low cost and a small package. In FIG. 2, for example, such an application is illustrated by way of a circuit interruption system having an overload relay 40 and a contactor unit 42. The overload relay 40 has a set of three-phase conductors 44 passing through apertures in its housing. The contactor unit 42 is conventional and can be implemented using, for example, Square D Class 8502, Type SA012.

The overload relay 40 includes either a set of three individual current transformers or a three phase current transformer 20' (shown in dotted lines) within the housing of the overload relay, and a manual reset button 54 for resetting the electronics and solenoid control and latch mechanism which commands the contactor unit 42 to interrupt the circuit path provided by the three phase conductors 44. Overload contacts 48 and auxiliary contacts 50 are provided for actuating the contactor unit 42 to interrupt the current path in the conductors 44 and for providing a trip indication output, respectively. A potentiometer dial 46 is included on the housing for the overload relay 40 to provide the user with the ability to change the set point for the current trip level within a pre-determined range. For further information regarding the circuit and operation of the circuit interruption system of FIG. 2, reference may be made to U.S. patent application Ser. No. 08/143,948 (RLC-10/SQUC-120), entitled "Self-Powered Circuit Interruption Arrangement," filed concurrently herewith and incorporated herein by reference.

Figure 3:
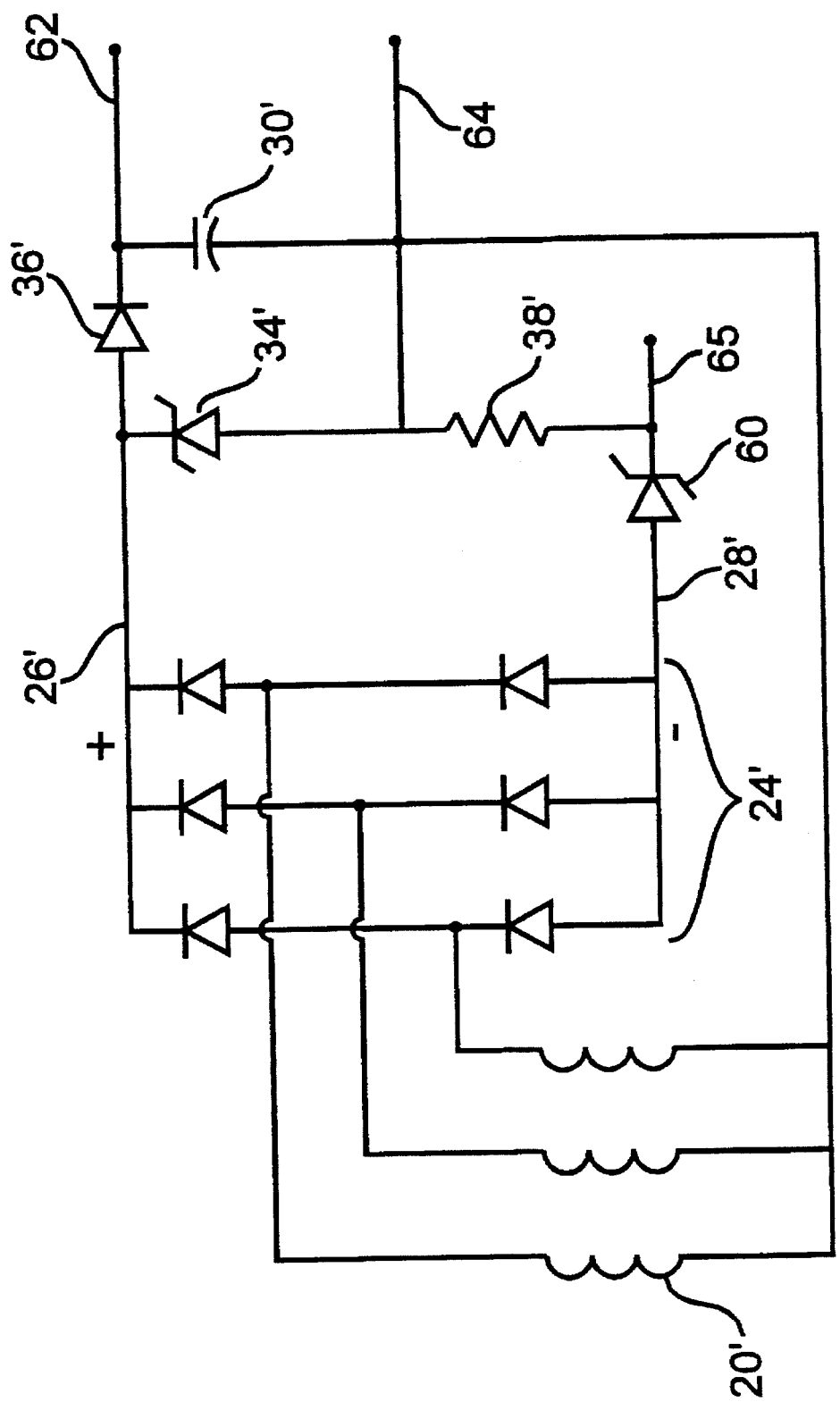
FIG. 3 is an expanded schematic view of a portion of the system of FIG. 2, illustrating the current transformers and a circuit design for conditioning the induced currents, in accordance with the present invention.

FIG. 3 illustrates a preferred embodiment for conditioning the current induced via the transformers 20' of FIG. 2, so that the primary current required to wake up the electronics is the same as that required for sinusoidal fidelity. In accordance with the present invention, it has been discovered that balancing the current required for waking up the electronics with the current required for sinusoidal fidelity can be optimized and significantly improved, with respect to a circuit arrangement configured as in FIG. 1, by including a second circuit having a burden resistor 38' and second clamping circuit zener diode 60 between the negative output 28' of the three-phase rectifier 24' and the burden resistor 38' of FIG. 3 and by adding a lead connecting the negative side of the power supply capacitor 30' to circuit common (ground) at the current transformers 20.

The zener diode 60 of FIG. 3 should be selected to have a low value relative to the specific type of current transformers and the power supply requirements. The function of the zener diode 60 is to increase the volt-seconds in the negative half-cycle of conduction at the negative output 28' just enough to allow the equivalent volt-seconds in the positive half-cycle at the positive output 26' to sufficiently energize the power supply, while being low enough to allow the required sinusoidal fidelity for measurement.

For example, using a model 3P1 type current transformer available from Instrument Transformers, Inc., a Florida corporation, power supply requirements not exceeding 0.4 mA @12 v, the burden resistor valued at 100 Ohms, and the zener diodes 34' and 60 can have breakover voltages of 12 volts and 3.6 volts, respectively.

Interfacing the circuit of FIG. 3 with a measurement electronics circuit, such as the overload relay discussed in connection with FIG. 2, can be accomplished by using the circuit of FIG. 3 in place of, for example, items 42, 60, 62 and 64 of FIG. 4 of copending patent application "Self-Powered Circuit Interruption Arrangement", supra, with leads of 62, 64 (FIG. 3 herein) driving the power supply and undervoltage lockout (as V+ and common, respectively), and lead 65 (FIG. 3 herein) driving the scaling amplifier shown in FIG. 4 of copending patent application "Self-Powered Circuit Interruption Arrangement".

Figure 4:
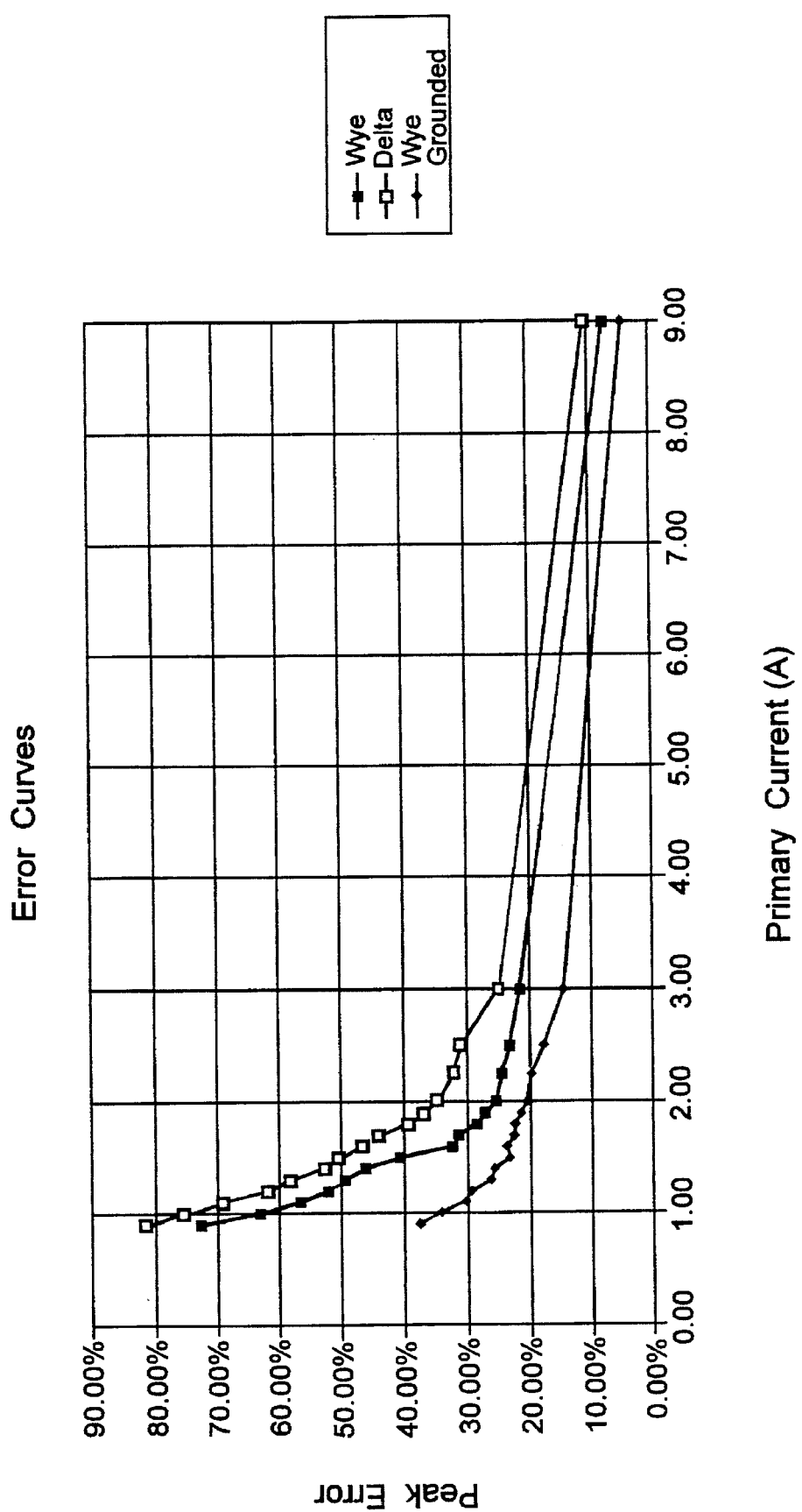
FIG. 4 is a plot of three error curves showing one aspect of the benefits of the present invention.

FIG. 4 illustrates three error curves, for each of Wye, Delta and Wye grounded transformer arrangements, reflecting the peak error for a given primary current at the current transformers 20'. The error curves represent the improvement in sinusoidal fidelity provided by the implementation of FIG. 3 as compared to that of FIG. 1 and another alternative connection mode for the current transformers, i.e., delta. Assuming that wake up is at 3 amperes, the error of the grounded Wye configuration is only 14% compared to 21% for isolated Wye configurations and 24% for the delta configuration.

Figure 5:
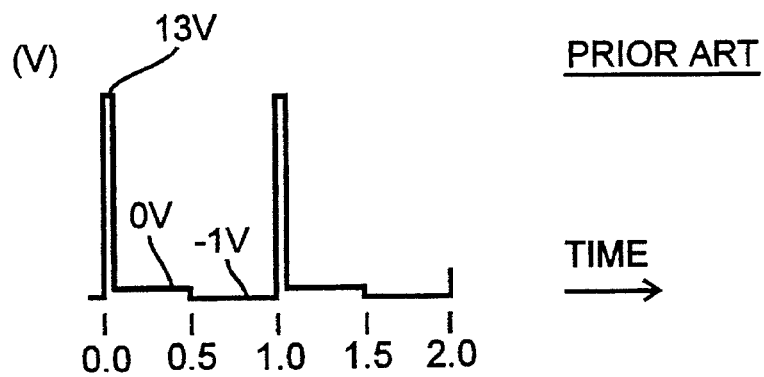
FIGS. 5 and 6 are illustrations of voltage and current waveforms, respectively, as seen at a current transformer secondary for the circuit of FIG. 1 modified in accordance with the practices of the prior art.
Figure 6:
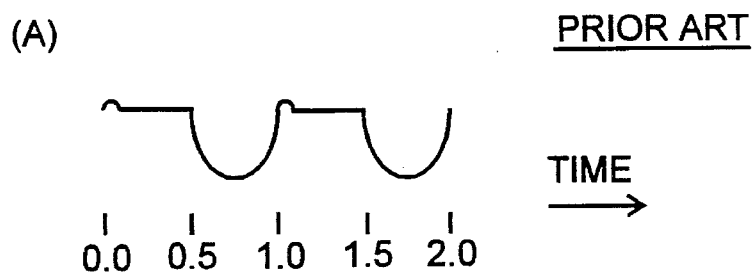
Figure 7:
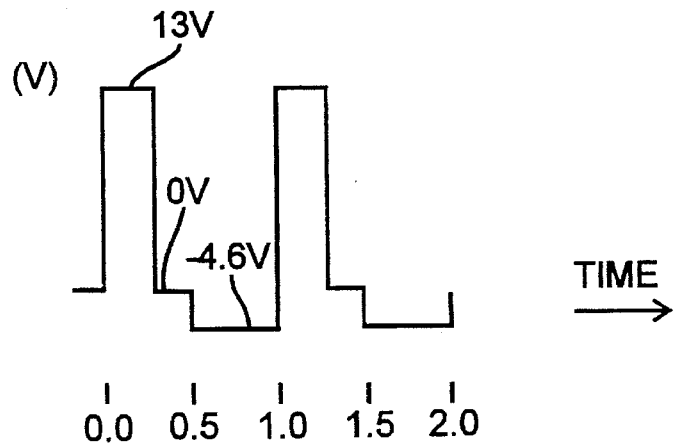
FIGS. 7 and 8 are illustrations of voltage and current waveforms, respectively, as seen at a current transformer secondary for the circuit of FIG. 3 and embodying the principles of the present invention.
Figure 8:
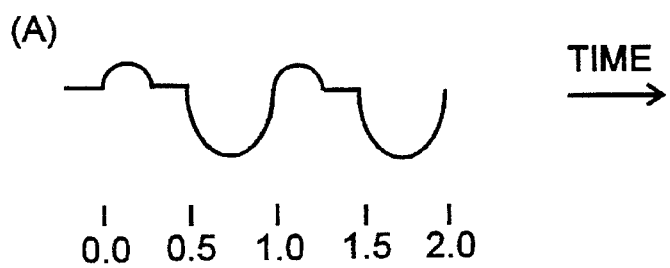

Referring now to FIGS. 5–8, illustrations of the voltage and current in the current transformer secondaries are shown for the Kampf-modified arrangement (FIGS. 5–6) and for the present invention (FIGS. 7–8). In each of these figures, an arbitrary cycle is shown beginning at time t=0, with the half cycle at t=0.5 and the cycle completed at time t=1. A second cycle, which is identical to the first cycle, begins at time t=1 with the termination of the first cycle.

With reference to FIG. 1 (modified), FIGS. 5 and 6 show that the positive half cycle extends well beyond the end of the first pulse but, conduction through the zener diode 34 is available only during the first pulse. In the second half cycle, from t=0.5 to t=1, conduction through the burden resister 38 is available during the entire second half cycle. However, because the volt-seconds in each half cycle must be the same, there is a significant mismatch between the first half cycle, used for charging the capacitor 30, and the second half cycle, used for measuring the waveform.

Assuming, for example, that each half cycle is 8.3 milliseconds and the breakover voltage for the zener diode and rectifier is 13 volts and the voltage required by the burden resistor and rectifier is 1 volt, the volt-seconds in the second half cycle is 8.3 volt-milliseconds and, therefore, the volt-seconds in the first half cycle is also 8.3 volt-milliseconds. Because the breakover for the zener diode 34 is 13 volts and the remainder of the first half cycle is at zero volts, the duration of the pulse in the first half cycle is 0.6 milliseconds (8.3 divided by 13). This means that there is more than sufficient fidelity in the negative half cycle to measure the waveform, but in the positive half cycle the current transformers can only conduct for 0.6 millisecond, which is not sufficient to charge the power supply capacitor 30 for operating the electronics.

For this reason, the improved common Wye connection of FIG. 3 employs the zener diode 60 to increase the voltage during the negative half cycle to 4.6 volts, thereby increasing the volt-seconds in the negative half cycle to 38 volt-milliseconds (4.6 volts times 8.3 milliseconds). Consequently, the duration of the pulse in the first half cycle increases to 2.9 milliseconds. While slightly reducing the fidelity of the waveform of the current being measured, the implementation of FIG. 3 is a five-fold improvement over the Kampf-modified arrangement in that it provides a current-charging period which is now sufficient to charge the power supply capacitor 30' for operating the electronics at the required primary wake up current.

Accordingly, a self-powered circuit interruption system has been disclosed, embodying the principles of the present invention and providing high-end performance in terms of current transformer selectivity and accuracy in detecting fault conditions.

Those skilled in the art will readily recognize that various modifications and changes may be made to the present invention without strictly following the exemplary circuits illustrated and described herein. Such changes would not depart from the true spirit and scope of the present invention, which is set forth in the following claims.

What is claimed is:

1. A current induction arrangement for developing a power supply voltage and a measurement signal from a circuit path, comprising:

a power supply including a capacitor arranged to accumulate current to develop a voltage with respect to common having a selected polarity;

a current transformer inducing current from the circuit path and providing an output having a first induced-current signal component of the selected polarity and a second induced-current signal component of the opposite polarity;

a rectifier circuit arranged to receive the output from the current transformer, and produce the first induced current signal component at a first output terminal, coupled to the capacitor for accumulating thereat, and the second induced current signal component at a second output terminal;

a first voltage clamping circuit receiving at least a portion of the first induced-current signal component, the first voltage clamping circuit having a first clamping terminal coupled to the first output terminal and a second terminal coupled to common;

a second circuit including a second voltage clamping circuit and coupled between the second output terminal and common, the second circuit arranged for developing a measurement voltage corresponding to the current produced by the current transformer and for providing a prescribed balance between the second induced-current signal component used to develop the measurement voltage and the first induced-current signal component used to charge the power supply capacitor; and the first and second induced-current signal components being returned to the current transformer via common.

2. A circuit induction arrangement, according to claim 1, wherein the second voltage clamp circuit includes a zener diode.

3. A circuit induction arrangement, according to claim 1, wherein the first voltage clamping circuit is a zener diode.

4. A circuit induction arrangement, according to claim 1, wherein the second circuit includes a burden resistor circuit arranged to convert the second induced current signal component to a corresponding voltage signal.

5. A circuit induction arrangement, according to claim 1, wherein the rectifier circuit is a three-phase rectifier circuit.

6. A circuit induction arrangement, according to claim 5, wherein the three-phase rectifier circuit includes three sets of diodes, each set including first and second terminals respectively connected to the first output terminal and the second output terminal.

7. A circuit induction arrangement, according to claim 1, wherein the current transformer is configured to induce current from three phases of the circuit path.

8. A circuit induction arrangement, according to claim 1, further including a diode coupled between the first voltage clamping circuit and the capacitor and arranged to prevent current flow in a direction from the capacitor to the first voltage clamping circuit.

9. A current induction arrangement for developing a power supply voltage and a measurement signal from a circuit path, comprising:

- a power supply including a capacitor arranged to accumulate current to develop a positive voltage with respect to common;
- a current transformer inducing current from the circuit path and providing an output having a positive induced current signal component and a negative induced-current signal component;
- a rectifier circuit arranged to receive the output from the current transformer, and produce the positive induced current signal component at a positive output terminal, coupled to the capacitor for accumulating thereat, and the negative induced current signal component at a negative output terminal;
- a first voltage clamping circuit receiving at least a portion of the positive induced-current signal component, the first voltage clamping circuit having a first clamping terminal coupled to the positive output terminal and arranged to couple the positive induced-current signal to the capacitor, and having a second terminal coupled to common;
- a burden resistor circuit, coupled between the negative output terminal and common, for developing a measurement voltage corresponding to the current produced by the current transformer;
- a second voltage clamping component coupled between the second output terminal and common and arranged in series with the burden resistor for providing a prescribed balance between the negative induced-current signal component used to develop the measurement voltage and the positive induced-current signal component used to charge the power supply capacitor;
- the positive and negative induced-current signal components being returned to the current transformer via common.

10. A circuit induction arrangement, according to claim 9, wherein the second voltage clamping component is a zener diode.

11. A circuit induction arrangement, according to claim 9, wherein the first voltage clamping circuit is a zener diode.

12. A circuit induction arrangement, according to claim 9, wherein the current transformer is a three-phase current transformer arrangement.

13. A circuit induction arrangement, according to claim 12, wherein the rectifier circuit is a three-phase rectifier circuit.

14. A circuit induction arrangement, according to claim 13, wherein the three-phase rectifier circuit includes three sets of diodes, each set including first and second terminals respectively connected to the positive output terminal and the negative output terminal.

15. A circuit induction arrangement, according to claim 10, wherein the rectifier circuit is a three-phase rectifier circuit.

16. A circuit induction arrangement, according to claim 9, further including a diode coupled between the first voltage clamping circuit and the capacitor and arranged to prevent current flow in a direction from the capacitor to the first voltage clamping circuit.

17. A circuit induction arrangement, according to claim 16, wherein the first voltage clamping circuit includes a zener diode.

18. A circuit induction arrangement, according to claim 17, wherein the zener diode is arranged to clamp the positive voltage at a selected voltage level.

19. A current induction arrangement for developing a power supply voltage and a measurement signal from a circuit path, comprising:

- a power supply including a capacitor arranged to accumulate current to develop a voltage with respect to common having a selected polarity;
- a current transformer inducing current from the circuit path and providing an output having a first induced-current signal component of the selected polarity and a second induced-current signal component of an opposite polarity;
- a rectifier circuit arranged to receive the output from the current transformer, and produce the first induced current signal component at a first output terminal, coupled to the capacitor for accumulating thereat, and a second output terminal;
- a first voltage clamping circuit receiving at least a portion of the first induced-current signal component, the first voltage clamping circuit having a first clamping terminal coupled to the first output terminal and a second terminal coupled to common;
- a second circuit coupled between the second output terminal and common, the second circuit arranged for developing a measurement voltage corresponding to the current produced by the current transformer, the second circuit further including a second voltage clamping circuit for increasing a voltage associated with the second induced-current signal to a desired value thereby causing a voltage pulse width associated with the first induced-current signal to be increased to a desired width for charging the capacitor; and
- the first and second induced-current signal components being returned to the current transformer via common.

* * * * *